US011614113B2

(12) United States Patent
Haser et al.

(10) Patent No.: US 11,614,113 B2
(45) Date of Patent: Mar. 28, 2023

(54) CONNECTING MEANS AND METHOD FOR CONNECTING TWO COMPONENTS

(71) Applicants: Lamello AG, Bubendorf (CH); Franz Baur, Oberstaufen (DE); Franz Josef Haser, Oberstaufen (DE)

(72) Inventors: Franz Josef Haser, Oberstaufen (DE); Franz Baur, Oberstaufen (DE); Patrick Jeker, Brislach (CH); Philipp Seiler, Arboldswil (CH)

(73) Assignees: Franz Baur, Oberstaufen (DE); Franz Josef Haser, Oberstaufen (DE); Lamello AG, Bubendorf (CH)

( * ) Notice: Subject to any disclaimer, the term of this patent is extended or adjusted under 35 U.S.C. 154(b) by 455 days.

(21) Appl. No.: 16/100,779

(22) Filed: Aug. 10, 2018

(65) Prior Publication Data

US 2018/0347608 A1    Dec. 6, 2018

Related U.S. Application Data

(63) Continuation of application No. PCT/EP2016/081079, filed on Dec. 14, 2016.

(30) Foreign Application Priority Data

Feb. 17, 2016    (DE) .................. 10 2016 202 450.7

(51) Int. Cl.
*F16B 12/20*    (2006.01)
*F16B 5/02*    (2006.01)
(Continued)

(52) U.S. Cl.
CPC .......... *F16B 12/2063* (2013.01); *F16B 5/02* (2013.01); *F16B 2012/106* (2013.01); *F16B 2012/145* (2013.01); *F16B 2012/2081* (2013.01)

(58) Field of Classification Search
CPC ........... Y10T 403/145; Y10T 403/4602; Y10T 403/73; A47B 2088/902; A47B 2230/08;
(Continued)

(56) References Cited

U.S. PATENT DOCUMENTS 1,338,202 A  *  4/1920  White ................... F16B 12/46
                                                108/161
2,654,923 A     10/1953  Johnson
(Continued)

FOREIGN PATENT DOCUMENTS

DE        964 722 B      5/1957
DE        964 722 C      5/1957
(Continued)

OTHER PUBLICATIONS

Leichtenmueller Peter, Connection System For Connecting Two Components By Connection Medium, Has Connection Medium With Housing, Where Housing Is Provided With Radial Screw Channel, Google Patents Translation of DE102008056027A1 (Year: 2010).*

*Primary Examiner* — Michael P Ferguson
*Assistant Examiner* — Zachary A Hall
(74) *Attorney, Agent, or Firm* — Aslan Law, P.C.

(57) ABSTRACT

In order to provide a connecting device for connecting two components, which is simple to manufacture and enables a stable and reliable connection of the two components, it is proposed that the connecting device comprises a main body which comprises a receiving channel extending through the main body for accommodating a fixing element, wherein the receiving channel is preferably accessible at one end by way of an insertion opening of the main body and/or preferably at a (further) end by way of a fixing opening of the main body, wherein the main body preferably further comprises an actuating opening that is different from the insertion opening and/or the fixing opening, by way of which in
(Continued)

particular the fixing element arranged in the receiving channel is preferably accessible for the actuation thereof.

29 Claims, 15 Drawing Sheets

(51) Int. Cl.
    *F16B 12/14*     (2006.01)
    *F16B 12/10*     (2006.01)

(58) Field of Classification Search
    CPC .... F16B 5/02; F16B 12/2009; F16B 12/2054; F16B 12/2063; F16B 2012/106; F16B 2012/145; F16B 2012/2081
    USPC .................................. 403/DIG. 12, DIG. 13
    See application file for complete search history.

(56) References Cited

U.S. PATENT DOCUMENTS

| | | | |
|---|---|---|---|
| 3,279,830 A | 10/1966 | Strom | |
| 3,675,312 A | 7/1972 | Herman | |
| 3,695,655 A * | 10/1972 | Wippermann | F16B 12/2054 411/72 |
| 4,060,949 A | 12/1977 | Busse | |
| 4,089,614 A | 5/1978 | Harley | |
| 4,131,376 A | 12/1978 | Busse | |
| 4,185,357 A | 1/1980 | Busse | |
| 4,236,848 A | 12/1980 | Rock et al. | |
| 4,353,663 A | 10/1982 | Glickman | |
| 4,505,610 A * | 3/1985 | Rock | F16B 12/2036 403/231 |
| 4,564,306 A * | 1/1986 | Rock | F16B 12/2036 403/14 |
| 4,579,474 A * | 4/1986 | Rock | F16B 12/2036 403/245 |
| 4,639,161 A | 1/1987 | Mazaki | |
| 4,944,627 A | 7/1990 | Durney | |
| 4,957,386 A * | 9/1990 | Harley | F16B 12/2063 403/231 |
| 4,984,926 A | 1/1991 | Harley | |
| 5,096,324 A | 3/1992 | Harley | |
| 6,481,919 B2 | 11/2002 | Marsh | |
| 6,877,536 B2 * | 4/2005 | Durney | B27M 1/08 144/134.1 |
| 7,159,288 B2 | 1/2007 | Van De Loo | B25B 5/145 29/238 |
| D569,716 S | 5/2008 | Kim | |
| 7,975,444 B2 * | 7/2011 | Holdsworth | E04C 5/165 52/223.7 |
| 8,562,239 B1 | 10/2013 | Liu et al. | |
| D696,574 S | 12/2013 | Caterinacci | |
| D697,393 S | 1/2014 | Sauer | |
| D711,727 S | 8/2014 | Sauer | |
| 8,938,857 B2 * | 1/2015 | Motosugi | E05D 5/0276 16/382 |
| D741,690 S | 10/2015 | Collins, IV | |
| 9,151,034 B2 * | 10/2015 | Jaeschke | E04B 1/4114 |
| 9,765,529 B2 | 9/2017 | Porter | |
| 10,100,862 B2 | 10/2018 | Yang | |
| D834,395 S | 11/2018 | Sawatski | |
| D878,903 S | 3/2020 | Roskamp et al. | |
| 10,753,381 B2 | 8/2020 | Grabher et al. | |
| D904,168 S | 12/2020 | Bastian et al. | |
| 10,876,284 B2 | 12/2020 | Knapp | |
| 2002/0066293 A1 | 6/2002 | Chang | |
| 2002/0106241 A1 * | 8/2002 | Marsh | F16B 12/46 403/403 |
| 2005/0175405 A1 | 8/2005 | Walz et al. | |
| 2007/0199272 A1 | 8/2007 | Qing et al. | |
| 2010/0202852 A1 | 8/2010 | Krause et al. | |
| 2011/0085853 A1 | 4/2011 | Liu | |
| 2011/0255915 A1 | 10/2011 | Chen et al. | |
| 2012/0301217 A1 | 11/2012 | Liu et al. | |
| 2014/0075882 A1 | 3/2014 | Porter | |
| 2014/0205373 A1 | 7/2014 | Anderson et al. | |
| 2015/0211567 A1 * | 7/2015 | Susnjara | F16B 25/0015 411/411 |
| 2016/0108945 A1 | 4/2016 | Yang | |
| 2017/0023041 A1 | 1/2017 | Koelling et al. | |
| 2017/0023043 A1 | 1/2017 | Koelling et al. | |
| 2018/0031019 A1 | 2/2018 | Sjostedt et al. | |
| 2018/0347608 A1 | 12/2018 | Haser et al. | |
| 2019/0211859 A1 | 7/2019 | Liu et al. | |
| 2020/0146447 A1 | 5/2020 | Brendel et al. | |
| 2020/0182278 A1 | 6/2020 | Ellis | |
| 2021/0003159 A1 | 1/2021 | Thomson | |

FOREIGN PATENT DOCUMENTS

| | | | |
|---|---|---|---|
| DE | 71 42 379 U | 2/1972 | |
| DE | 2 044 096 A1 | 3/1972 | |
| DE | 25 48 527 A1 | 5/1977 | |
| DE | 2610200 A * | 9/1977 | F16B 5/02 |
| DE | 26 25 182 A1 | 12/1977 | |
| DE | 78 04 537 U1 | 8/1978 | |
| DE | 2855216 A1 * | 7/1979 | F16B 12/2036 |
| DE | 79 14 171 U1 | 3/1987 | |
| DE | 87 07 218 U1 | 8/1987 | |
| DE | 690 16 621 T2 | 2/1995 | |
| DE | 49902686-0001 | 10/1999 | |
| DE | 299 16 748 U1 | 1/2000 | |
| DE | 201 14 852 U1 | 1/2002 | |
| DE | 40304809-0005 | 10/2003 | |
| DE | 40304809-0010 | 10/2003 | |
| DE | 20 2004 000 473 U1 | 5/2004 | |
| DE | 40503372-0009 | 12/2005 | |
| DE | 20 2007 000 439 U1 | 6/2008 | |
| DE | 10 2008 056 027 A1 | 5/2010 | |
| DE | 202012004845 U1 * | 6/2012 | F16B 43/02 |
| DE | 402014000058-0004 | 9/2014 | |
| DE | 402014000353-0001 | 2/2015 | |
| DE | 402014000353-0002 | 2/2015 | |
| DE | 402014002015-0010 | 9/2015 | |
| DE | 402014002015-0011 | 9/2015 | |
| DE | 20 2016 008 672 U1 | 1/2019 | |
| EM | 000268578-0003 | 3/2005 | |
| EM | EU 000374053-0001 | 8/2005 | |
| EM | 000521356-0001 | 6/2006 | |
| EM | 000579339-0001 | 10/2006 | |
| EM | 000914973-0001 | 5/2008 | |
| EM | 001205371-0001 | 4/2010 | |
| EM | 001205371-0002 | 4/2010 | |
| EM | 001747833-0002 | 8/2010 | |
| EM | 001805029-0003 | 6/2011 | |
| EM | 001805029-0004 | 6/2011 | |
| EM | 002250738-0001 | 6/2013 | |
| EM | 002333195-0003 | 10/2013 | |
| EM | 002364281-0004 | 12/2013 | |
| EM | 001400162-0001 | 1/2014 | |
| EM | 002460279-0001 | 5/2014 | |
| EM | 003237361-0001 | 7/2016 | |
| EM | 001135073-0003 | 7/2019 | |
| EP | 0 990 804 A1 | 4/2000 | |
| EP | 1001175 A2 * | 5/2000 | F16B 5/02 |
| EP | 1 793 129 A1 | 6/2007 | |
| EP | 1892353 A1 * | 2/2008 | F16B 5/02 |
| FR | 1 546 888 A | 11/1968 | |
| FR | 2 333 991 A | 7/1977 | |
| FR | 2 446 946 A | 8/1980 | |
| GB | 1 368 905 A | 10/1974 | |
| GB | 1 561 985 A | 2/1977 | |
| IR | D084920-0001 | 12/2014 | |
| JP | 2001-73472 A | 3/2001 | |
| JP | 2001-227515 A | 8/2001 | |
| JP | 3119588 U | 3/2006 | |
| JP | 3177219 U | 7/2012 | |
| KR | 20-0181638 Y1 | 5/2000 | |
| TR | 2004/31406 | 4/2006 | |
| WO | WO 00/60244 A1 | 10/2000 | |

(56) References Cited

FOREIGN PATENT DOCUMENTS

WO     WO-2009146503 A1 * 12/2009  ......... F16B 12/2063
WO     WO 2014/005173 A1     1/2014

* cited by examiner

CONNECTING MEANS AND METHOD FOR CONNECTING TWO COMPONENTS

RELATED APPLICATION

This application is a continuation of international application No. PCT/EP2016/081079 filed on Dec. 14, 2016, and claims the benefit of German application No. 10 2016 202 450.7 filed on Feb. 17, 2016, which are incorporated herein by reference in their entirety and for all purposes.

FIELD OF DISCLOSURE

The present invention relates to a connecting device, which is used in particular in furniture construction and mechanical engineering. In particular, two components of a piece of furniture or two components of a machine are connectable to each other by means of the connecting device.

SUMMARY OF THE INVENTION

The object underlying the present invention is to provide a connecting device for connecting two components, which is simple to manufacture and enables a stable and reliable connection of the two components.

This object is achieved in accordance with the invention by a connecting device for connecting two components, wherein the connecting device comprises a main body, which comprises a receiving channel extending through the main body for accommodating a fixing element, wherein the receiving channel is preferably accessible at one end by way of an insertion opening of the main body and/or preferably at a (further) end by way of a fixing opening of the main body, wherein the main body further comprises an actuating opening that is different from the insertion opening and/or the fixing opening, by way of which in particular the fixing element arranged in the receiving channel is preferably accessible for the actuation thereof.

Therein that the main body comprises an insertion opening and/or a fixing opening, the fixing element may preferably be simply and securely arranged in the main body and fixed thereon. Therein that the main body further preferably comprises an actuating opening that is different from the insertion opening and/or the fixing opening, the fixing element may preferably be actuated through a particularly narrow and/or visually appealing access opening.

In particular, a comfortable handling of the connecting device as well as a reliable and stable connection of the two components is made possible by the combination of insertion opening, fixing opening, and actuating opening.

The insertion opening of the main body preferably serves for the insertion of the fixing element into the receiving channel.

Provision may also be made, however, for the fixing element to be insertible into the receiving channel through the actuating opening.

The actuating opening is then preferably simultaneously the insertion opening.

The actuating opening is preferably formed, at least in sections and/or at least approximately, complementary to an outer contour of the fixing element.

For example, provision may be made for the actuating opening to comprise a narrow slot section and a section that is wider in comparison thereto, by way of which in particular a screw head of a fixing element configured as a screw is insertible into the receiving channel.

The fixing opening of the main body preferably serves for fixing the fixing element on the main body, on the one hand, and on a further component, on the other hand.

The fixing element in the assembled state of the connecting device preferably projects partially out of the fixing opening.

In particular, provision may be made for the fixing element in the assembled state of the connecting device to engage behind the fixing opening of the main body at its inner side facing the receiving channel.

The actuating opening is preferably configured as an actuating slot.

The insertion opening and/or the fixing opening preferably each have a substantially circular cross section taken perpendicularly to a connecting direction of the connecting element.

It may be favorable if the main body is formed as one piece.

For example, provision may be made for the main body to be configured as a plastic injection molded component or as a metal die cast component.

It may be advantageous if the fixing element is a screw.

Provision may hereby be made for the insertion opening to be larger than a screw head of the screw.

Alternatively or in addition hereto, provision may be made for the fixing opening to be smaller than the screw head of the screw.

Alternatively or in addition hereto, provision may further be made for the fixing opening to be larger than a threaded section of the screw.

By the wording "larger" and "smaller", it is to be understood in this description and the appended claims in particular that the respective element (screw head, threaded section) is able to be passed through the opening (opening larger than the stated element) or precisely not able to be passed through the opening (opening smaller than the stated element).

It may be advantageous if the fixing opening comprises one or more projections projecting radially inwardly, which in particular are able to be brought into engagement with a threaded section of a fixing element configured as a screw.

The fixing element is then in particular secured against falling out on the main body in an assembly-ready state.

In an embodiment of the invention, provision may be made for the actuating opening to be smaller in at least one direction than a maximum, minimum, and/or average outer diameter, taken perpendicularly to a connecting direction of the fixing element, of the fixing element, in particular a screw head and/or a threaded section of a fixing element configured as a screw.

The connecting direction is preferably parallel to an insertion direction of the fixing element, in which the fixing element is insertible into the receiving channel through the insertion opening.

The connecting direction is preferably parallel to a main direction of extension of the receiving channel.

It may be favorable if the connecting direction is parallel to a rotational axis of the fixing element. The fixing element is preferably formed substantially rotationally symmetrical about the rotational axis.

Provision may further be made for the rotational axis of the fixing element to be that axis about which the fixing element is rotatable or rotated for the fixing thereof on the further component.

For example, provision may be made for the connecting direction to be substantially parallel to a main direction of extension of an actuating opening configured as an actuating slot.

The connecting direction is preferably a fixing direction, in which a force acting between the two components by means of the connecting device is oriented.

Provision may be made for the fixing element to comprise an engagement section, on which a user of the connecting device is able to engage by means of a tool for actuating the fixing element.

The tool for actuating the fixing element, together with the engagement section, preferably forms an angular gear.

For this purpose, the engagement section is configured in particular as a male or female element of a hexagonal connection or six-round connection.

The engagement section is preferably arranged and/or formed on a screw head of a fixing element configured as a screw.

The male part of the connection is preferably configured as a round head, in particular in order to be able to actuate the fixing element even in the case of oblique orientation of the tool.

It may be favorable if the main body comprises a, for example cuboidal, base section and one or more anchoring sections projecting away or protruding from the base section for anchoring the main body in one of the components.

At least one anchoring section is preferably configured as a cylindrical thickening of an end of the main body remote from the fixing opening.

At least one anchoring section may be configured, for example, as an anchoring bolt projecting away from the base section perpendicularly or obliquely to a connecting direction of the connecting device.

Provision may be made for the actuating opening to extend in a direction running parallel to a connecting direction of the connecting device over at least about a third, in particular at least about half, of a length of the main body taken in the connecting direction.

In particular, provision may be made for the actuating opening to extend in a direction running parallel to a connecting direction of the connecting device over at least about two thirds of a length of the main body taken in the connecting direction.

An outer side of the main body remote from the receiving channel is preferably provided at least in sections with one or more anchoring elements, in particular anchoring ribs, for anchoring the main body in a component.

In particular, an anchoring in a direction taken perpendicularly to the connecting direction is possible by means of the anchoring ribs.

Provision may also be made, however, for an anchoring of the main body in a direction running parallel to the connecting direction to be achieved by means of the anchoring ribs.

It may be advantageous if the connecting device, in addition to the fixing element and the main body which is arrangeable in a first of the two components, comprises a counter piece which is fixable on a second of the two components. For connecting the two components, the fixing element is preferably able to be brought into engagement with the counter piece, for example screwable thereto, commencing from the main body.

The main body preferably comprises one, two, or more positioning projections, which extend in particular away from the main body in the connecting direction, in particular in a region of the fixing opening.

The positioning projections are in particular guidable into a bore or a counter piece in the second component, in order to enable a simple relative positioning of the two components before the fixing of the fixing element.

The connecting device is suited in particular for use in combination with two components. One of the components preferably has a recess corresponding to an outer shape of the main body of the connecting device, such that the main body is fixable in the component in a positive-fitting manner.

The combination in accordance with the invention preferably has individual or multiple of the features and/or advantages described in conjunction with the connecting device in accordance with the invention.

The recess in the one of the components is preferably accessible both from a main side of the, for example plate-shaped, component and from a narrow side of said component.

In the assembled state of the connecting device, the fixing element preferably extends beyond the narrow side of the component and/or into the further component.

The components are preferably furniture parts or machine parts.

The main body of the connecting device may be fixed on and/or in one of the components, for example by way of press fit and/or by means of an adhesive connection.

Alternatively or in addition hereto, provision may be made for the main body to be fixable on and/or in one of the two components by means of a screwing connection, by means of one or more drive-in bolts, by means of a dovetail connection, and/or by means of one or more pins.

The tool for actuating the fixing element is preferably able to be brought into engagement directly with the fixing element.

For connecting the two components, the fixing element may, for example, be fixed on the one component by means of the main body and engage directly or indirectly on the further component and/or be brought into engagement with the further component.

A fixing element configured as a screw may, for example, with respect to a screw head and/or a threaded section, be a torx screw, an Allen screw, a Euro screw, a Spax screw, or a screw with M-threading.

In particular in the case of an indirect fixing of the fixing element on and/or in the further component, a counter piece is preferably arranged, in particular fixed, in and/or on the further component. The fixing element preferably engages on said counter piece.

The counter piece may, for example, be an insertion plate, a drive-in bushing, an insert bushing, a drive-in nut, or a glue-in nut.

The present invention further relates to a method for connecting two components.

The object underlying the invention in this regard is to provide a method for connecting two components, which is easy to carry out and enables a stable and reliable connection of two components.

This object is achieved in accordance with the invention in that the method for connecting two components comprises the following:

providing a component, in particular a plate-shaped component;

introducing a recess by machining the component, in particular by means of a milling machine, in which a milling head is rotated about a rotational axis running perpendicularly to a main side of the component, in particular a main side of the plate-shaped component;

inserting a main body of a connecting device into the recess, in particular inserting a main body of a connecting device in accordance with the invention into the recess;

connecting the components to each other by actuating a fixing element of the connecting device, which is arranged in the main body.

The method in accordance with the invention preferably has individual or multiple of the features and/or advantages described in conjunction with the connecting device in accordance with the invention.

It may be favorable if the fixing element is inserted into the main body before the main body is arranged in the recess of the component.

The fixing element is preferably introduced into the main body by way of an insertion opening of the main body. The insertion opening is preferably inaccessible in an assembled state of the main body, in which the latter is arranged in the recess of the component.

In the assembled state of the main body, in which the latter is arranged in the recess of the component, a fixing opening of the main body and an actuating opening of the main body are preferably accessible.

The fixing element preferably projects out of the main body through the fixing opening, but is thereby preferably held in the main body in a positive-fitting manner due to an undercut.

Both the fixing opening and the actuating opening are preferably, in at least one direction of extension, smaller than a maximum outer diameter of the fixing element, in particular with respect to an axis of symmetry or rotational axis or longitudinal axis of the fixing element.

The fixing element is preferably removable from the main body neither through the fixing opening nor through the actuating opening.

The recess and/or the main body of the connecting device are preferably shaped such that, by means of the main body, the recess provided in the component is substantially entirely filled or fillable with the main body.

The recess preferably extends both in a main side of the component and in a secondary side, in particular a narrow side, of the component. A connecting direction of the connecting device is preferably oriented perpendicularly to a secondary side, in particular a narrow side, of the component.

An oblique orientation of the connecting direction relative to the narrow side may also be provided, however.

A face side of the main body, in which the fixing opening is arranged, is oriented, for example, substantially perpendicularly to the connecting direction.

Provision may further be made for the face side, in which the fixing opening is arranged, to form with the connecting direction an angle of about 45°, for example. As a result, the connecting device may be used to connect two mitered plates.

The fixing element is preferably mounted and/or accommodated in the main body so as to be rotatable about a rotational axis running parallel to the connecting direction.

For example, a fixing element configured as a screw may, by way of rotation thereof by means of a tool, be screwed directly into the second component. Alternatively hereto, provision may be made for the fixing element to be screwable into a counter piece arranged on and/or in the second component.

The fixing element is preferably accessible by way of the actuating opening, in order to put the fixing element into a rotational movement by means of a tool.

It may be favorable if the main body of the connecting device comprises multiple anchoring sections, which are configured as at least sectionally cylindrical thickenings.

The at least sectionally cylindrical thickenings are in particular arranged and/or formed directly adjoining each other.

It may be favorable if the at least sectionally cylindrical thickenings overlap each other, such that the main body in a cross section is formed substantially cloud-shaped, for example.

The anchoring sections, in particular the at least sectionally cylindrical thickenings, preferably have axes of symmetry running parallel to each other.

The axes of symmetry are preferably oriented perpendicularly to a connecting direction of the connecting device.

In an embodiment of the invention, provision may be made for the connecting device to comprise a spreading device.

A spreading device preferably comprises one or more spreading elements, which in particular are able to be moved away from the main body, in particular able to be pivoted out of the main body, in order to anchor the main body in a component.

It may be favorable if one or more spreading elements are formed as one piece with the main body.

It may be advantageous if two or more spreading elements are arranged on both sides of a receiving channel of the main body.

One or more spreading elements are preferably actuateable by means of the fixing element, in particular during the fixing of the fixing element in the fixing opening.

It may be advantageous if the spreading elements are moveable in opposing directions by means of the fixing element.

The spreading elements preferably project into the receiving channel in a not-spread initial state.

It may be advantageous if one or more spreading element have one or more actuating faces, for example oblique faces, on which the fixing element engages for actuating the one or more spreading elements and by means of which the one or more spreading elements are able to be brought from an initial position into a spread position.

It may be favorable if one or more spreading elements are able to be moved outwardly out of the receiving channel by means of a screw head of a fixing element configured as a screw, in order to ultimately be fixed in a component, for example in a clamping manner.

Further preferred features and/or advantages of the invention are subject matter of the subsequent description and the illustrative depiction of exemplary embodiments.

BRIEF DESCRIPTION OF THE DRAWINGS

Like or functionally equivalent elements are provided with the same reference numerals in all figures.

DETAILED DESCRIPTION OF THE DRAWINGS

Figure 1:
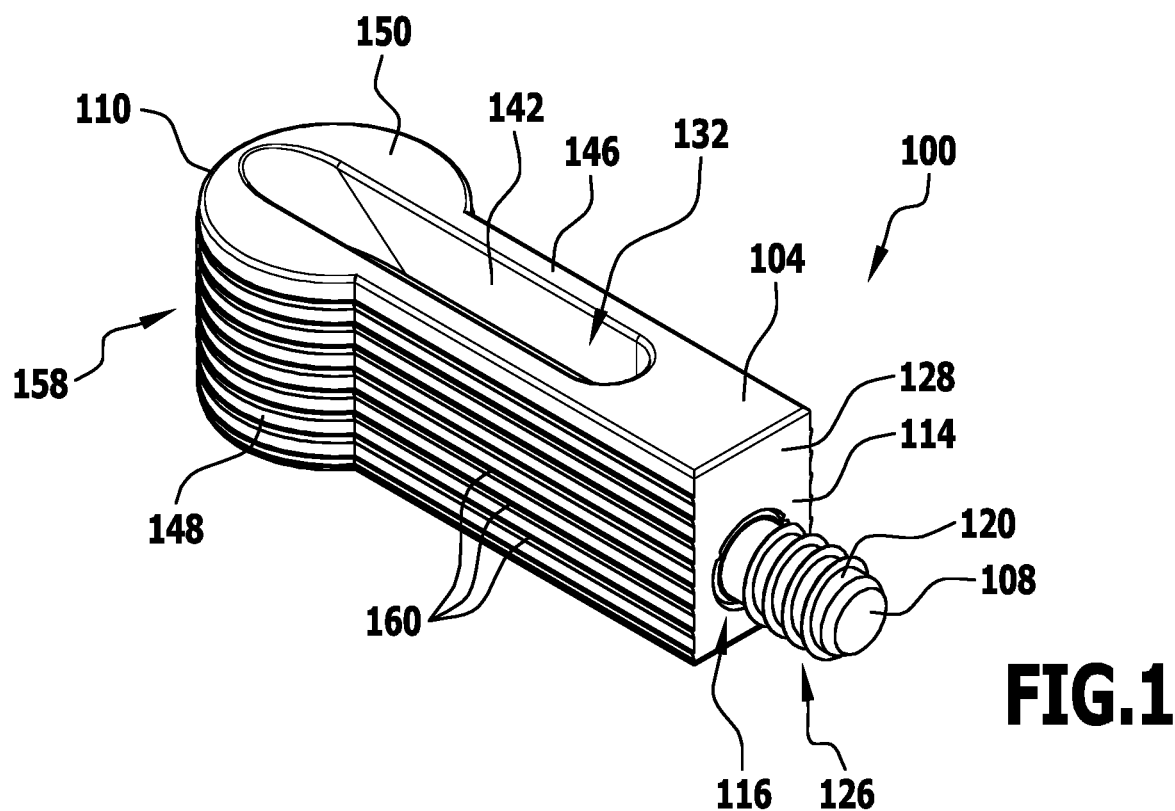
FIG. 1 shows a schematic perspective depiction of a first embodiment of a connecting device, in which a main body is provided for accommodating a fixing element, wherein the fixing element is insertible into the main body by way of an insertion opening and projects partially out of a fixing opening of the main body in an assembled state of the connecting device.

A first embodiment depicted in FIGS. 1 to 12 of a connecting device designated as a whole with 100 serves, for example, for connecting two components 102, in particular furniture parts or machine parts.

The connecting device 100 comprises a main body 104, which in particular is formed as one piece as a plastic injection molded component or as a metal die cast component.

The main body 104 comprises a receiving channel 106 for accommodating a fixing element 108. The receiving channel 106 preferably extends through the main body 104.

An end 110 of the receiving channel 106 preferably forms an insertion opening 112 of the main body 104, by way of which the fixing element 108 may be inserted into the receiving channel 106 of the main body 104.

A further end 114 of the receiving channel 106 preferably forms a fixing opening 116 of the main body 104.

The fixing element 108 is fixable or fixed on and/or in said fixing opening 116, in order to connect the two components 102 to each other.

The insertion opening 112 is preferably of larger dimensions than the fixing opening 116.

In particular, provision is made for the fixing element 108 to be able to be passed entirely through the insertion opening 112, while only a part of the fixing element 108 passes through the fixing opening 116.

In the assembled state of the connecting device 100, the fixing element 108 thus preferably projects only partially out of the fixing opening 116.

On the end 114 of the receiving channel 106 remote from the fixing opening 116, said receiving channel 106 preferably has a tapering section 118.

Said tapering section 118 is preferably engaged from behind by means of the fixing element 108 in order to prevent an undesired pushing out or pulling out of the fixing element 108 through the fixing opening 116.

The fixing element 108 is a screw 120, for example.

A screw head 122 of the screw 120 is preferably dimensioned such that it is does not pass through the tapering section 118, but rather engages it from behind with respect to a connecting direction 124 of the connecting device 100.

A threaded section 126 of the screw 120, however, is preferably dimensioned such that it is able to be passed through the tapering section 118 and thus is able to project out of the fixing opening 116.

The fixing opening 116 is preferably arranged and/or formed in a face side 128 of the main body 104.

The face side 128 is preferably oriented perpendicularly to the connecting direction 124 in the embodiment of the connecting device 100 depicted in FIGS. 1 to 12.

Figure 2:
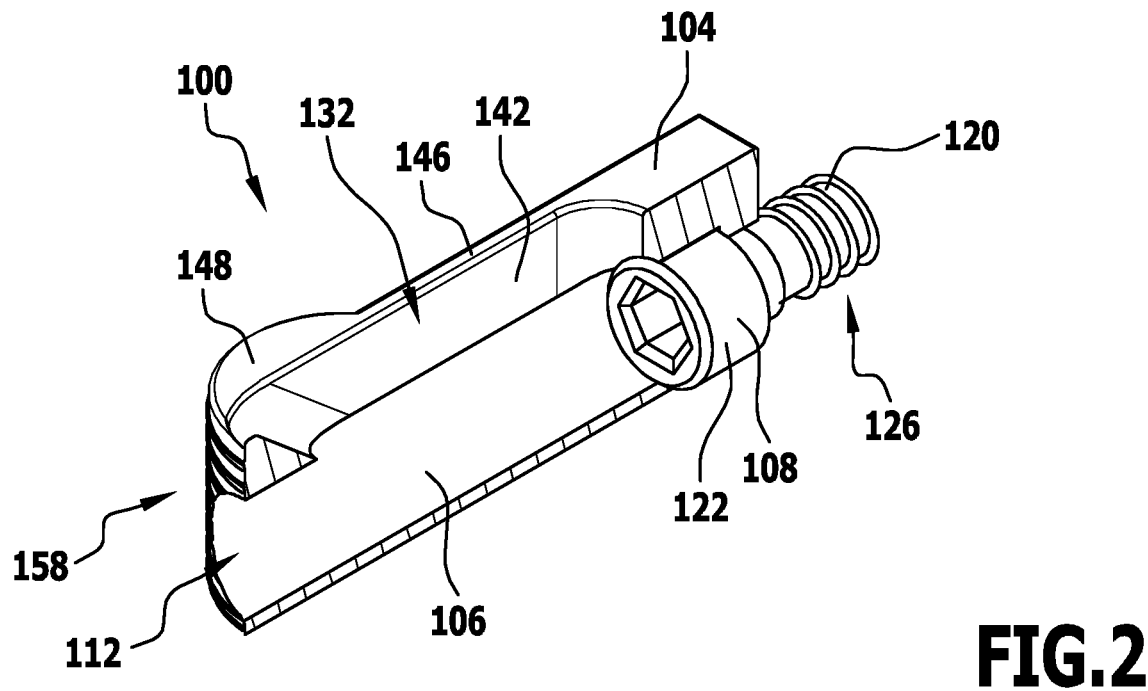
FIG. 2 shows a schematic perspective depiction of the connecting device from FIG. 1, wherein a main body of the connecting device is depicted in a longitudinal section.
Figure 3:
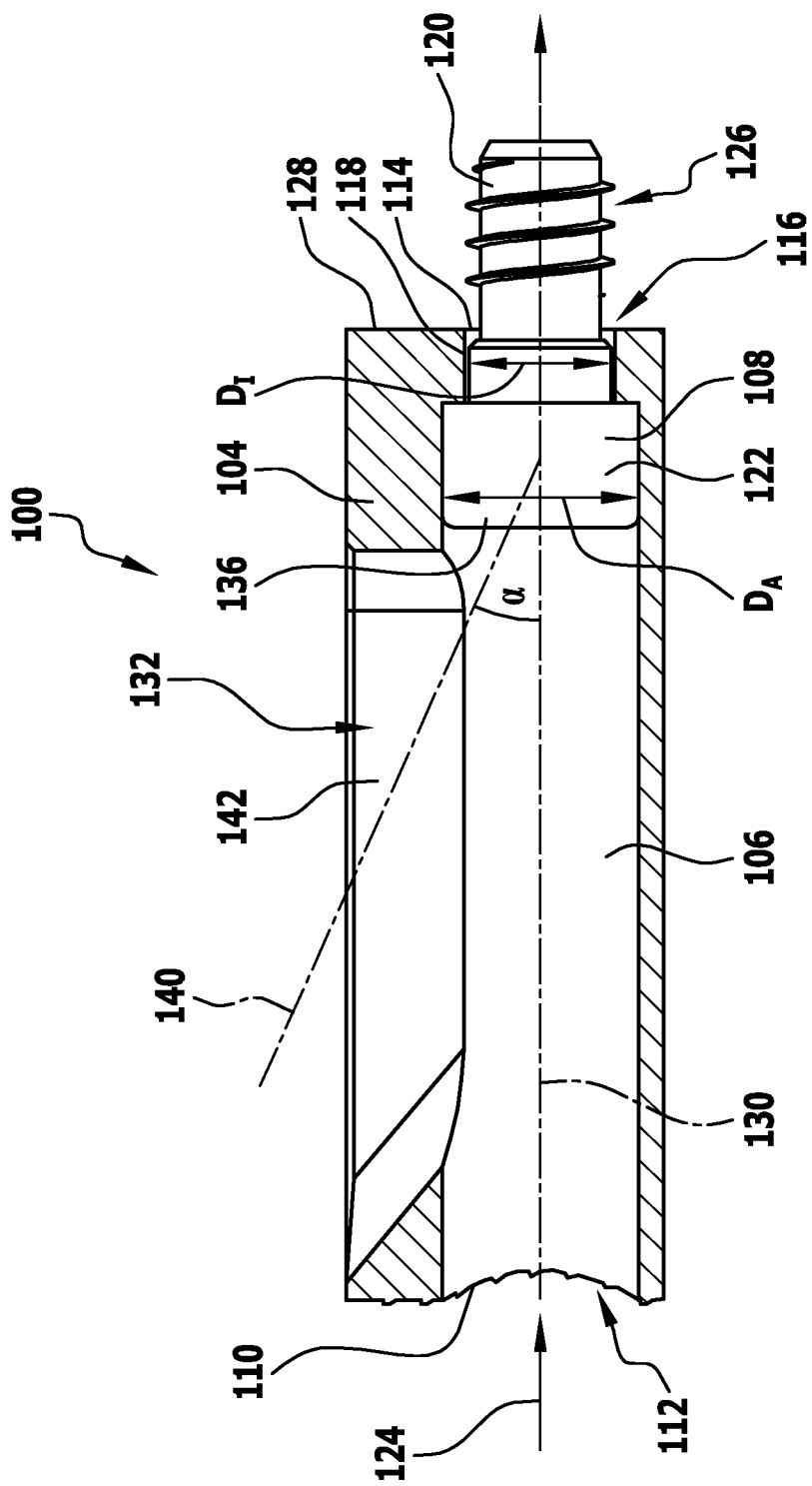
FIG. 3 shows a schematic side view of the connecting device with the cut main body from FIG. 2.
Figure 4:
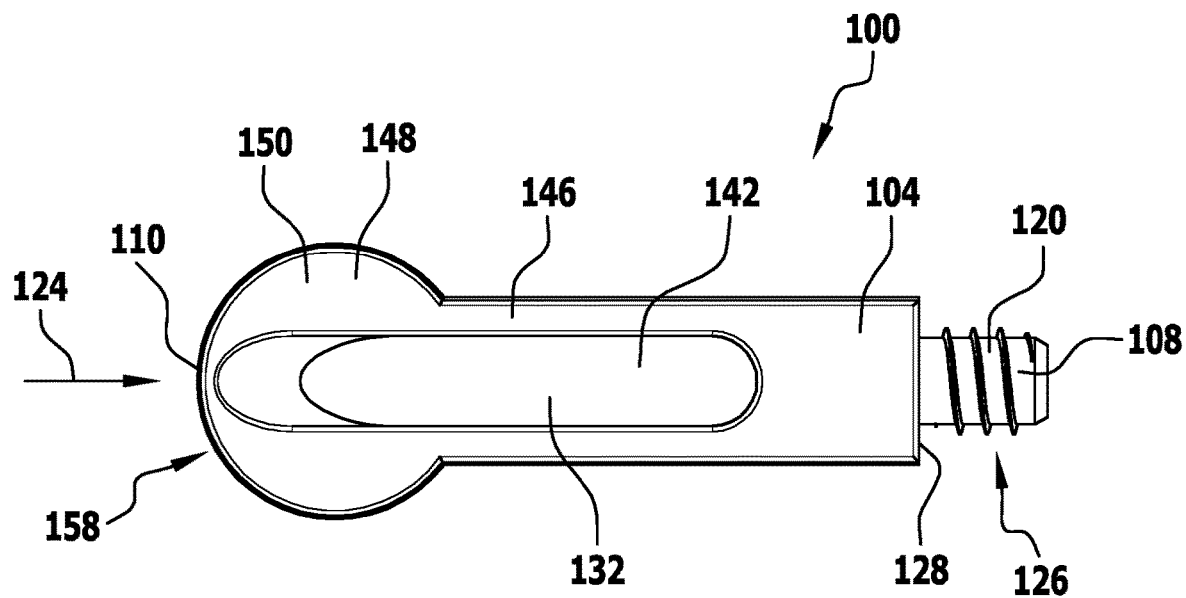
FIG. 4 shows a schematic top view of an upper side of the connecting device from FIG. 1.
Figure 5:
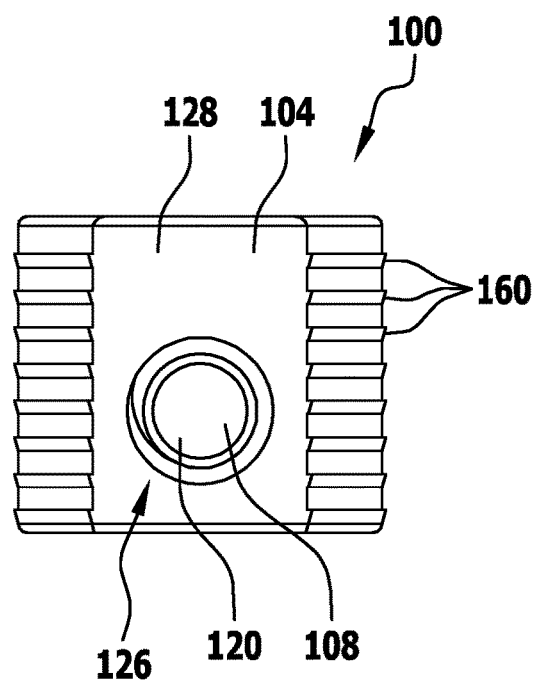
FIG. 5 shows a schematic top view of a face side of the connecting device from FIG. 1.
Figure 6:
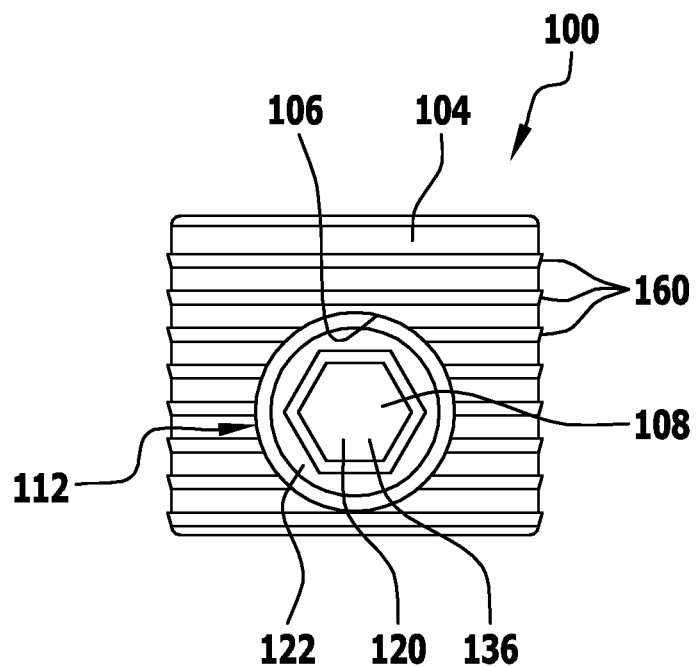
FIG. 6 shows a schematic top view of an end of the main body opposite the face side.

As may be gathered in particular from FIGS. 2 and 3, the receiving channel 106 of the connecting device 100 is formed substantially rotationally symmetrical about a rotational axis 130, for example.

The rotational axis 130 is thereby preferably simultaneously a rotational axis 130, about which the fixing element 108 is rotatable for connecting the two components 102.

In a direction running perpendicularly to the rotational axis 130, the screw head 122 of the fixing element 108 configured as a screw 120 preferably has an outer diameter $D_A$, which is larger than an inner diameter $D_I$ of the tapering section 118 of the main body 104.

In addition to the insertion opening 112 and the fixing opening 116, the main body 104 preferably comprises an actuating opening 132.

The receiving channel 106 is preferably likewise accessible by way of said actuating opening 132.

Provision is made in particular for the fixing element 108, which is arranged in the receiving channel 106, to be accessible by way of the actuating opening 132.

A tool 134 is preferably able to be brought into engagement with the fixing element 108 through the actuating opening 132, in particular in order to actuate said fixing element 108.

The fixing element 108 preferably has an engagement section 136, on which the tool 134 may engage for actuating the fixing element 108.

The engagement section 136 is an internal hexagonal receiver or internal six-round receiver, for example, on which, for example, a spherical head 138 of the tool 134, formed complementary hereto is able engage.

Figure 11:
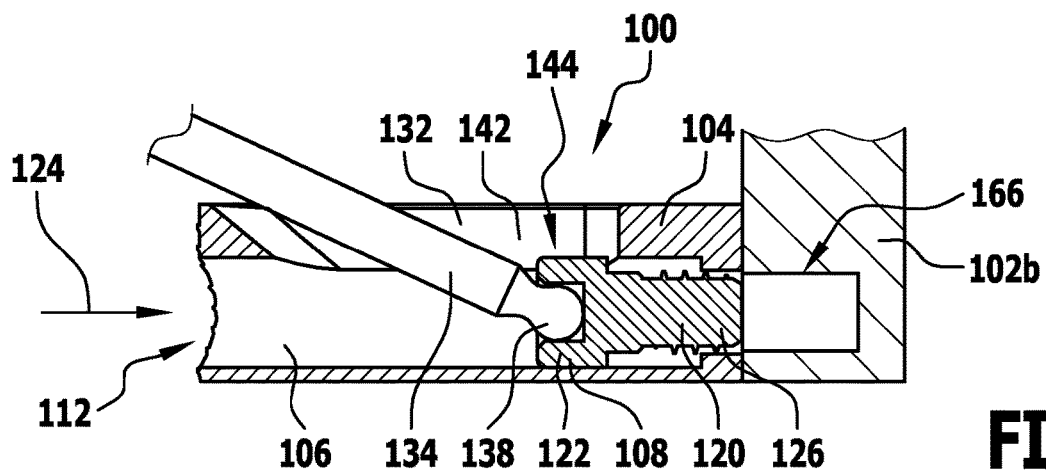
FIG. 11 shows a schematic depiction corresponding to FIG. 10 of the connecting device, wherein the fixing element is actuated through an actuating opening of the main body by means of a tool.
Figure 12:
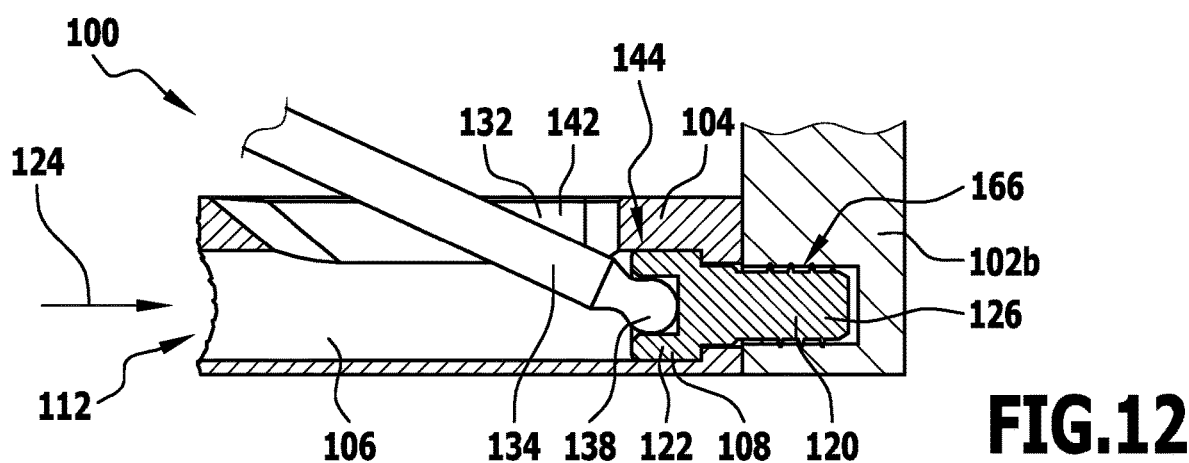
FIG. 12 shows a schematic depiction corresponding to FIG. 10 of the connecting device, wherein the fixing element has been brought by means of the tool into a connected state in which the fixing element engages on the further component or a counter piece arranged in the further component, in order to connect the two components to each other.

A may be gathered in particular from FIGS. 3, 11 and 12, the tool 134 for actuating the fixing element 108 is rotatable about an engagement axis 140 oriented obliquely to the rotational axis 130.

For example, an angle α (alpha) of about 30° between the rotational axis 130 and the engagement axis 140 may hereby be provided.

The tool 134 is thus in particular able to be passed obliquely through the actuating opening 132.

The actuating opening 132 is therefore preferably configured as an actuating slot 142.

The spherical head 138 and the engagement section 136 preferably form an angular gear 144, with which the rotational movement of the tool 134 is transmittable to the fixing element 108.

For anchoring the main body 104 in a component 102, the main body 104 preferably has a base section 146 and one or more anchoring sections 148 protruding or projecting from the base section 146.

An anchoring section 148 may, for example, be configured as a cylindrical thickening 150 of the end 110 of the main body 104 remote from the face side 128.

Figure 8:
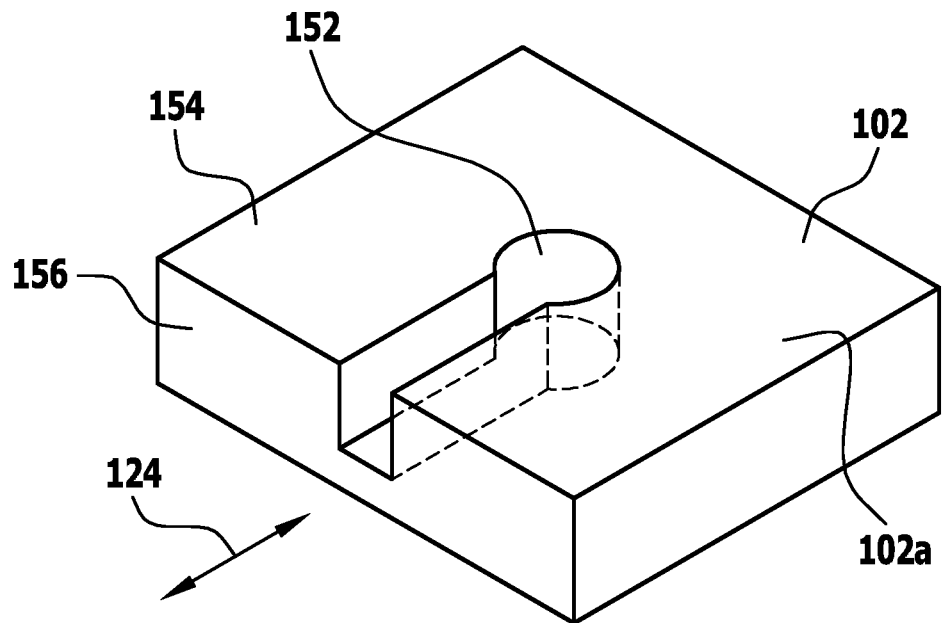
FIG. 8 shows a schematic perspective depiction of a component, which has a recess for accommodating the main body of the connecting device from FIG. 1.
Figure 9:
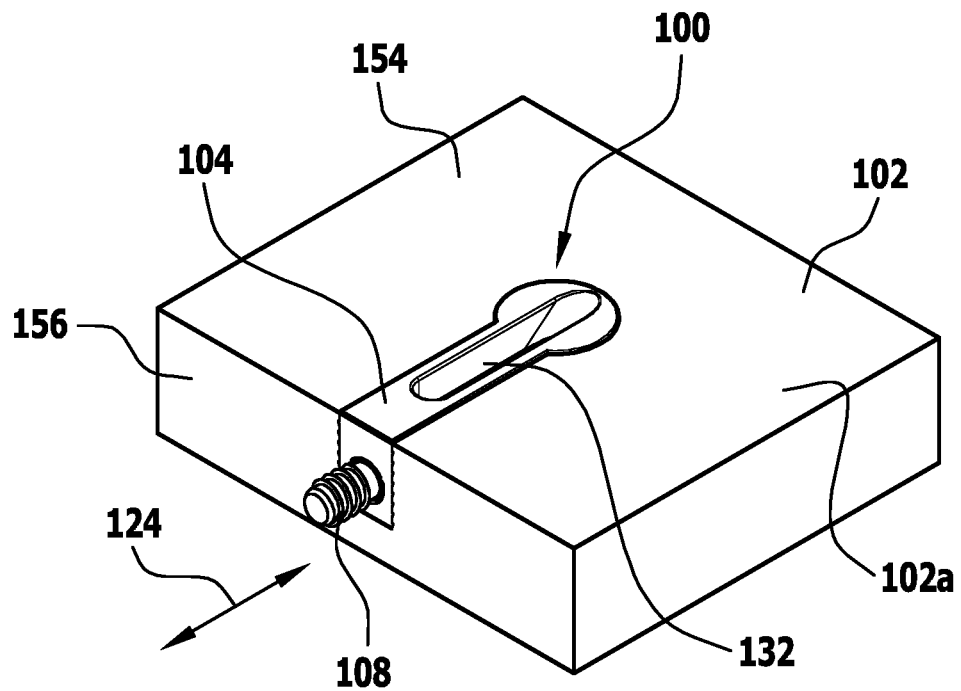
FIG. 9 shows a schematic perspective depiction of the component corresponding to FIG. 8, including a connecting device arranged in the recess.
Figure 10:
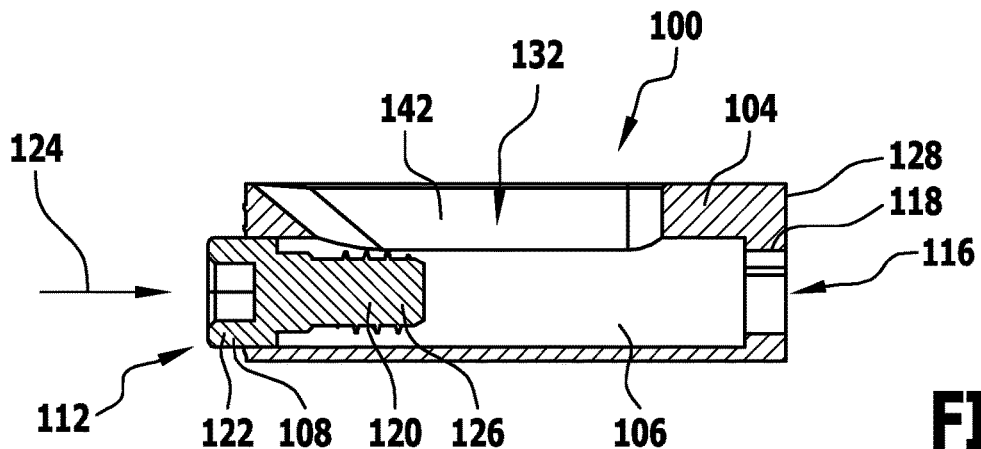
FIG. 10 shows a schematic longitudinal section through the connecting device from FIG. 1, wherein a fixing element configured as a screw is inserted into the main body by way of the insertion opening of the main body.

The one or more anchoring sections 148 project in particular away from the base section 146 in one or more directions running perpendicularly to the connecting direction 124, such that the main body 104 is fixable in particular in a positive-fitting manner in a recess 152 in a component 102, said recess formed complementary to the main body 104 (see in particular FIGS. 8 and 9).

As may be gathered in particular from FIG. 8, the recess 152 is preferably arranged and/or formed in a component 102 in such a way that the recess 152 extends both in a main side 154 and in a narrow side 156 of the component 102. The orientation of the recess 152 is thereby preferably selected such that the connecting direction 124 is oriented at least approximately perpendicularly to the narrow side 156.

As is indicated by a comparison of FIGS. 8 and 9, the recess 152 and the main body 104 are preferably formed complementary to each other, such that the recess 152 is substantially entirely fillable by means of the main body 104.

An outer side 158 of the main body 104 remote from the receiving channel 106 is preferably provided with one or more anchoring ribs 160.

The anchoring ribs 160 are in particular linear barbs, which enable the insertion of the main body 104 into the recess 152, but which inhibit a removal of the main body 104 from the recess 152.

Figure 7:
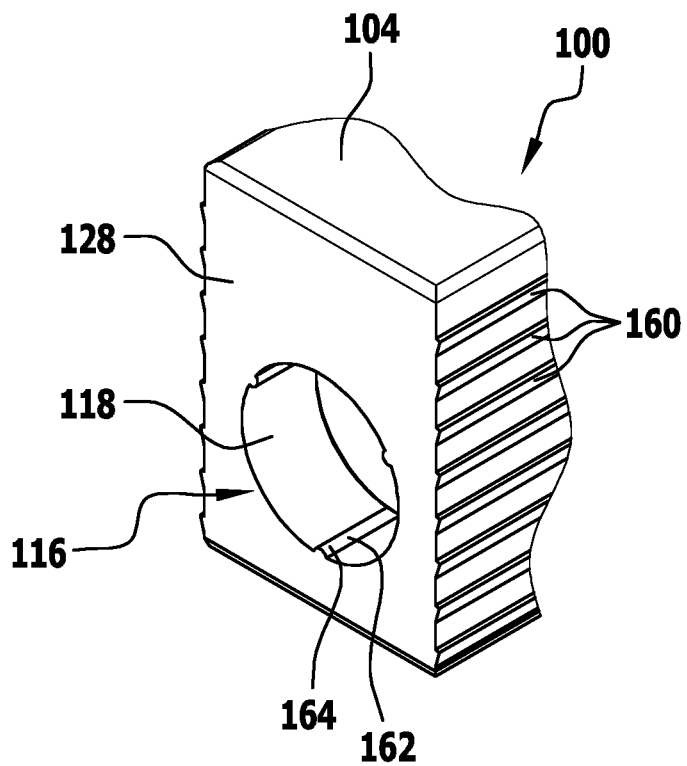
FIG. 7 shows an enlarged schematic perspective depiction of the face side of the main body of the connecting device from FIG. 1.

A may be gathered in particular from FIG. 7, provision may be made for the tapering section 118 of the main body 104 to comprise one or more retaining projections 162, for example retaining ribs 164.

By means of said retaining projections 162, the inner diameter $D_I$ of the tapering section 118 is locally reduced, such that in particular a threaded section 126 of a fixing element 108 configured as a screw 120 is able to be accommodated in the tapering section 118 in a clamping or latching manner.

The fixing element 108 may hereby be held on the main body 104 and in particular be secured against undesirably falling out of the main body 104.

The embodiment of a connecting device 100 described above functions in particular as follows:

Two components 102 to be connected to each other are preferably prepared in that a recess 152 is introduced into a first component 102*a* (see in particular FIG. 8).

The shape of the recess 152 is in particular formed complementary to the shape of the main body 104 of the connecting device 100, such that the main body 104 is fixable in the recess 152 in particular in a positive-fitting manner.

The positive fit thereby relates in particular to a connecting direction 124, in which a force which later connects the two components 102 acts.

The recess 152 is introduced into the first component 102*a* by means of a milling machine, for example.

A second component 102*b* is provided with a bore 166, for example (see in particular FIG. 11).

The connecting device 100 is prepared for the assembly thereof and of the components 102 preferably in that the fixing element 108, configured for example as a screw 120, is inserted into the receiving channel 106 of the main body 104 by way of the insertion opening 112.

The fixing element 108 is thereby in particular pushed so far through the receiving channel 106 until the fixing element 108 comes into engagement with the retaining projections 162 and is thereby securely held on the main body 104.

The main body 104 is then inserted together with the fixing element 108 into the recess 152 of the first component 102a.

The two components 102 are then arranged in the desired position to be fixed by means of the connecting device 100.

In particular, a threaded section 126 of the fixing element 108 configured as a screw 120, which projects out of the fixing opening 116, may thereby already be partially inserted into the bore 166 of the second component 102b.

In a next step, the tool 134 is passed through the actuating opening 132 and brought into engagement with the engagement section 136 of the fixing element 108.

The fixing element 108 may be put into rotation by rotating the tool 134.

In particular, the fixing element 108 is thereby screwed into the bore 166 of the second component 102b.

The two components 102 are tightly connected to each other as a result.

A force transmission along the connecting direction 124 then occurs, on the one hand, between the second component 102b and the threaded section 126 of the fixing element 108 configured as a screw and, on the other hand, between the anchoring section 148 of the main body 104 and the recess 152 in the first component 102a.

The force transmission between the main body and the fixing element 108 occurs between the screw head 122 and the tapering section 118.

By appropriately designing the anchoring section 148, even large forces may preferably be transferred from the first component 102 or to the first component 102, without having to fear an undesired pulling out of the recess 152 in the region of the narrow side 156.

In particular, it may be achieved by way of the arrangement of the anchoring section 148 or the anchoring sections 148 on the end 110 of the main body 104 remote from the fixing opening 116 that the forces acting on the first component 102a are transmitted at a great distance from the narrow side 156.

Figure 13:
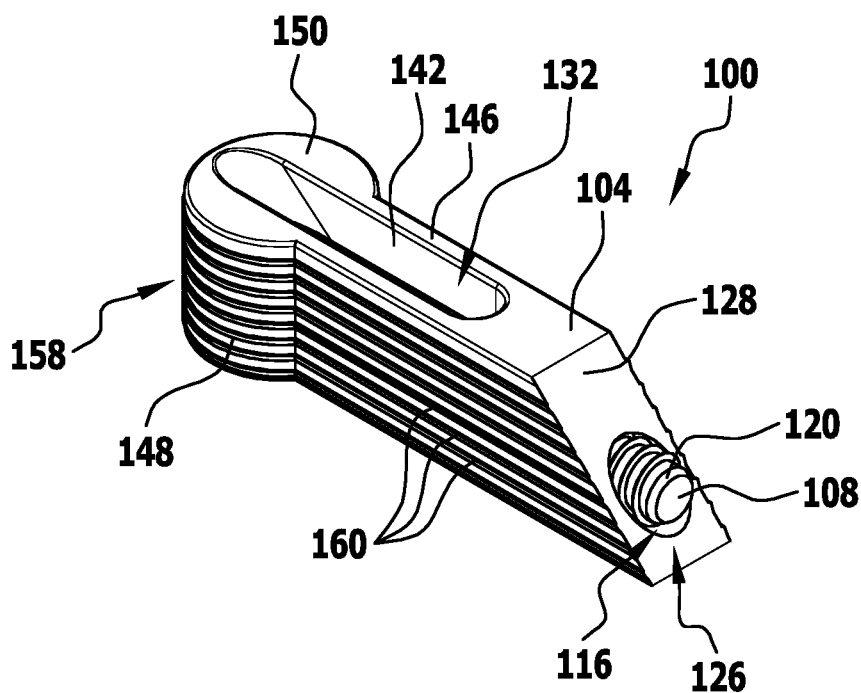
FIG. 13 shows a schematic perspective depiction corresponding to FIG. 1 of a second embodiment of a connecting device, in which a main body is provided with a face side running obliquely to the connecting direction.
Figure 14:
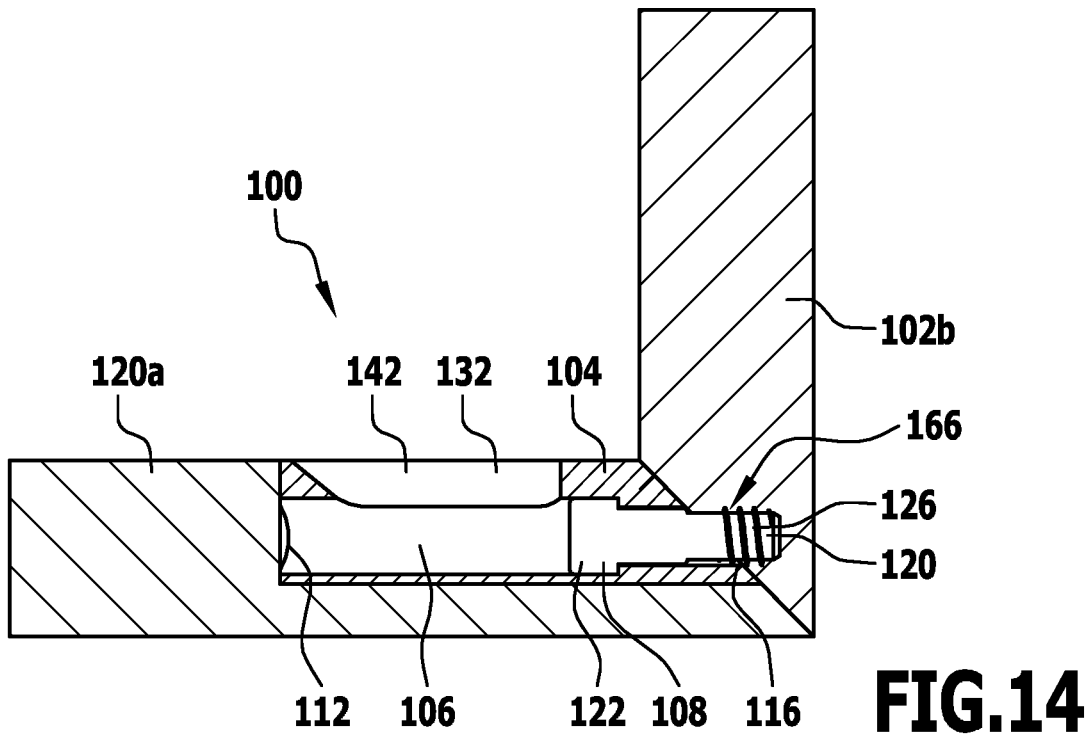
FIG. 14 shows a schematic sectional depiction corresponding to FIG. 12 of the connecting device from FIG. 13, including two components connected to each other by means of said connecting device.
Figure 15:
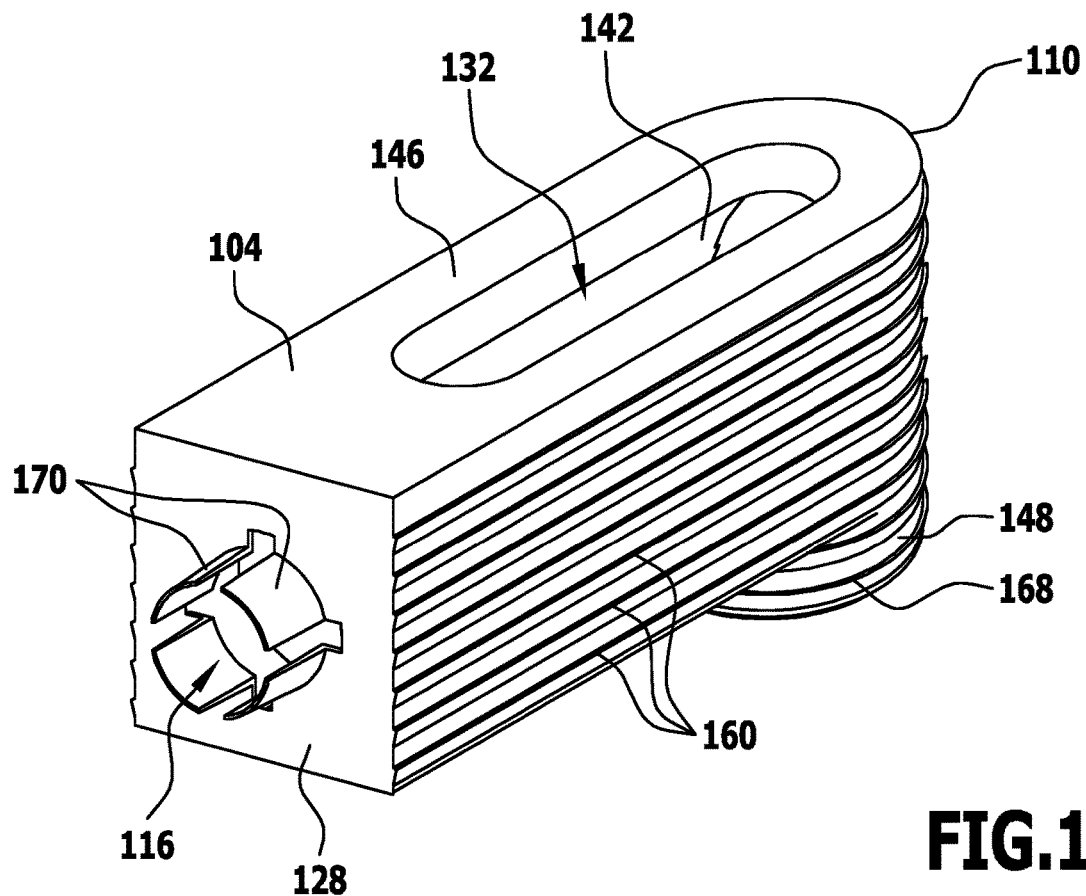
FIG. 15 shows a schematic perspective depiction of a third embodiment of a connecting device, in which a main body is provided with an anchoring bolt and multiple positioning projections.
Figure 16:
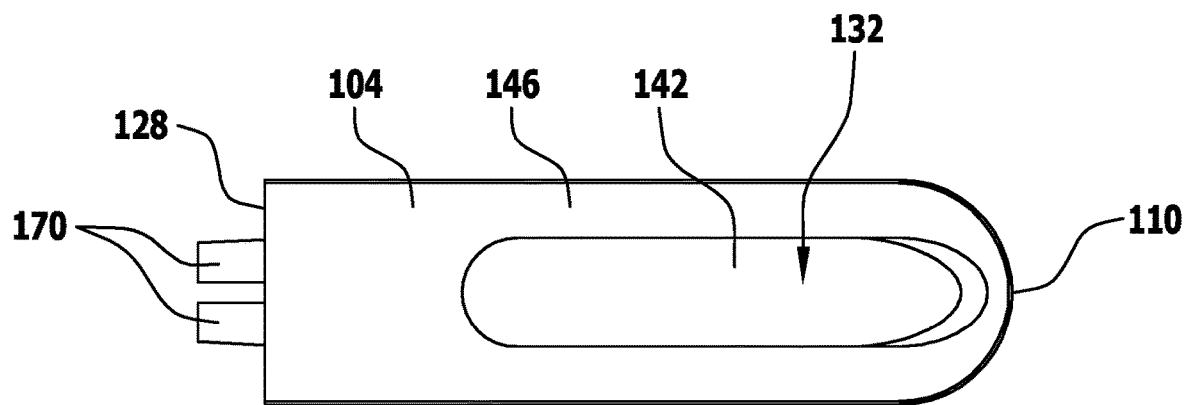
FIG. 16 shows a schematic top view of the main body of the connecting device from FIG. 15.
Figure 17:
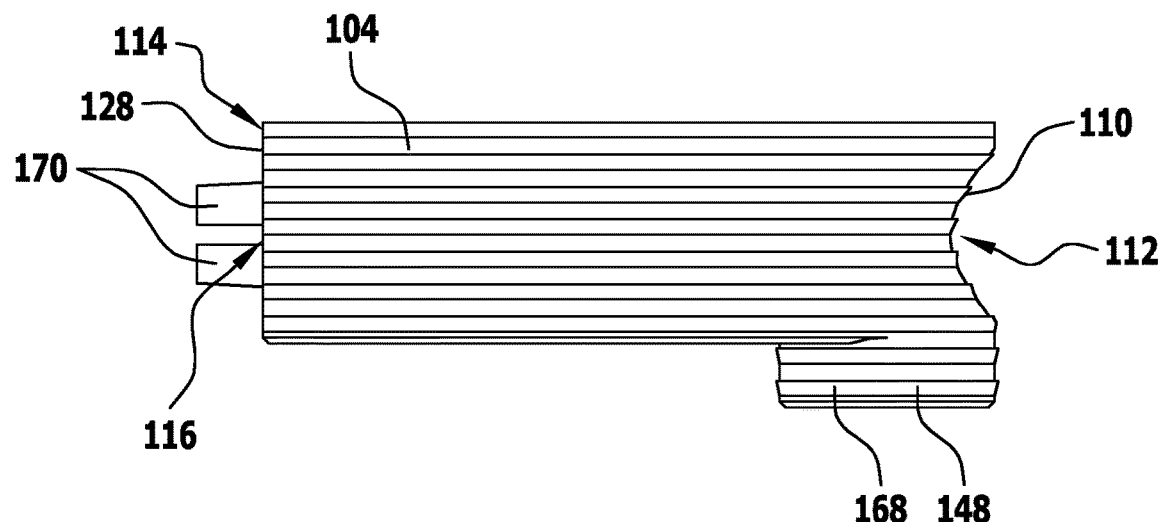
FIG. 17 shows a schematic side view of the main body of the connecting device from FIG. 15.
Figure 18:
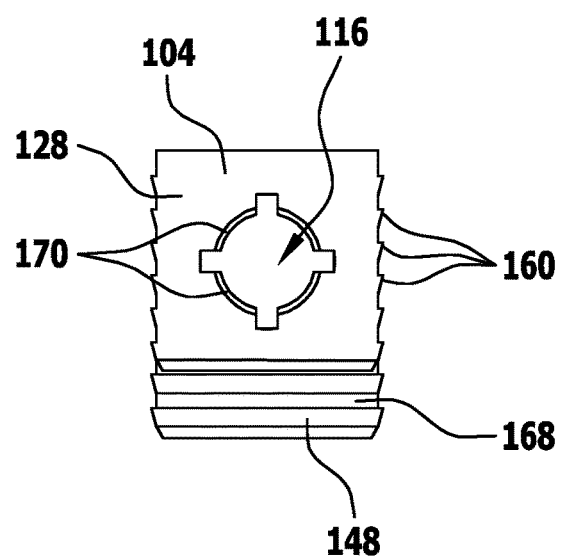
FIG. 18 shows a schematic top view of a face side of the main body of the connecting device from FIG. 15.
Figure 19:
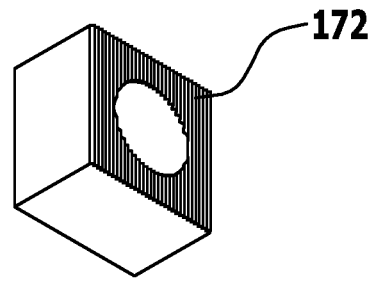
FIG. 19 shows a schematic perspective depiction of a counter piece configured as an insertion plate for fixing on a further one of the two components and for connecting to a fixing element of a connecting device.
Figure 20:
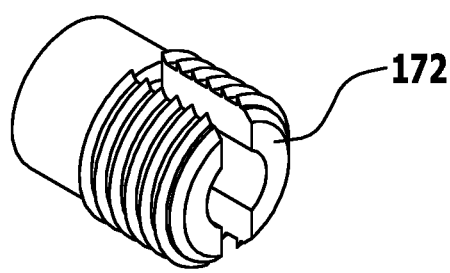
FIG. 20 shows a schematic perspective depiction of a counter piece configured as a drive-in bushing.
Figure 21:
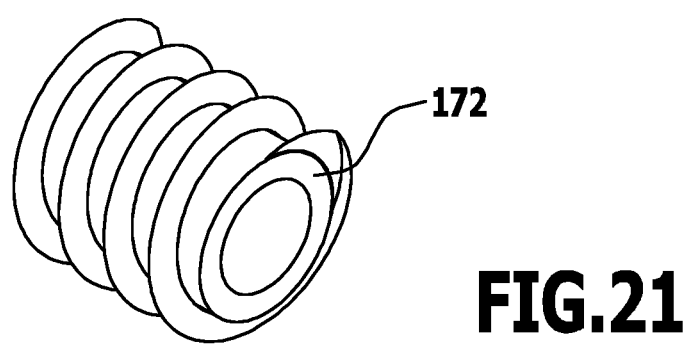
FIG. 21 shows a schematic perspective depiction of a counter piece configured as an insert bushing.
Figure 22:
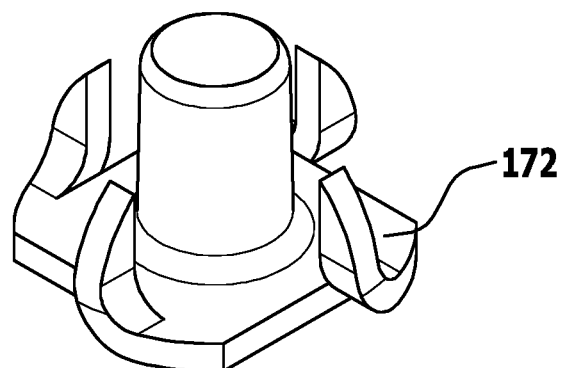
FIG. 22 shows a schematic perspective depiction of a counter piece configured as a drive-in nut.

A second embodiment of a connecting device 100 depicted in FIGS. 13 and 14 differs from the first embodiment depicted in FIGS. 1 to 12 substantially in that the face side 128 of the main body 104 is oriented obliquely to the connecting direction 124.

The connecting device 100 in accordance with the second embodiment depicted in FIGS. 13 and 14 is suited in particular for connecting two mitered components 102.

In particular, the face side 128 of the main body 104 is oriented tilted by 45° to the connection 124, such that the connecting device 100 is suited in particular for connecting two components 102 to be arranged at a 90° angle to each other if said components 102 are each provided with a 45° miter.

In all other respects, the second embodiment of the connecting device 100 depicted in FIGS. 13 and 14 corresponds with respect to construction and function to the first embodiment depicted in FIGS. 1 to 12, such that reference is made to its preceding description in that regard.

A third embodiment of a connecting device 100 depicted in FIGS. 15 to 18 differs from the first embodiment depicted in FIGS. 1 to 12 substantially in that the main body 104 has an anchoring bolt 168 in place of the cylindrical thickening 150.

The anchoring bolt 168 extends in particular away from the base section 146 of the main body 104 perpendicularly to a main side 154 of the first component 102a in which the main body 104 is fixable.

The anchoring bolt 168 is preferably arranged on the end 110 of the main body 104 remote from the fixing opening 116.

Further, in the third embodiment of the connecting device 100 depicted in FIGS. 15 to 18, provision is made for the main body 104 to comprise one or more, for example four, positioning projections 170.

The positioning projections 170 are in particular arranged on the face side 128 of the main body 104 and form, for example, an annular expansion of the fixing opening 116 and/or the tapering section 118.

The positioning projections 170 serve in particular for positioning the main body 104 in the second component 102b relative to a bore 166, independently of the fixing element 108, whereby, when orienting the components 102 relative to each other, the positioning projections 170 are already inserted into the bore 166 of the second component 102b before the fixing of the fixing element 108.

In all other respects, the third embodiment of the connecting device 100 depicted in FIGS. 15 to 18 corresponds with respect to construction and function to the first embodiment depicted in FIGS. 1 to 12, such that reference is made to its preceding description in that regard.

Optional counter pieces 172 of the connecting device 100 are depicted in FIGS. 19 to 23.

The depicted counter pieces 172 are used in particular individually in combination with a main body 104 and a fixing element 108 if the fixing element 108 is, for whatever reason, not to be fixed directly on the second component 102b.

In these cases, one of the counter pieces 172 or a not-depicted counter piece 172 is fixed, for example screwed, latched, bonded, etc., on the second component 102b.

The fixing element 108 then does not engage directly on the second component 102b in order to connect the two components 102. Rather, the fixing element 108 is then preferably brought into engagement with the counter piece 172 in and/or on the second component 102b.

Figure 23:
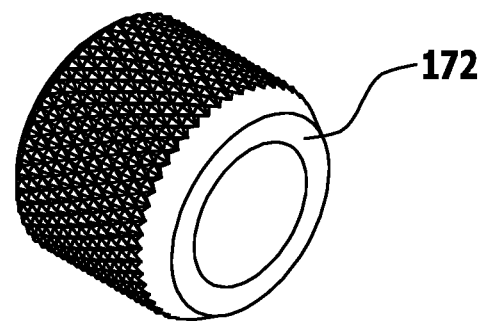
FIG. 23 shows a schematic perspective depiction of a counter piece configured as a glue-in nut.

The counter piece 172 may thereby be, for example, an insertion plate (see FIG. 19), a drive-in bushing (see FIG. 20), an insert bushing (see FIG. 21), a drive-in nut (see FIG. 22), or a glue-in nut (see FIG. 23).

A fourth embodiment of a connecting device 100 depicted in FIGS. 24 to 29 differs from the first embodiment depicted in FIGS. 1 to 12 substantially in that two spreading elements 200 of a spreading device 201 are provided.

The spreading elements 200 are in particular pivoting elements 202, which are formed as one piece with the main body 104 and are fixed on the main body 104 so as to be moveable, in particular pivotable, with respect to the receiving channel 106.

Figure 24:
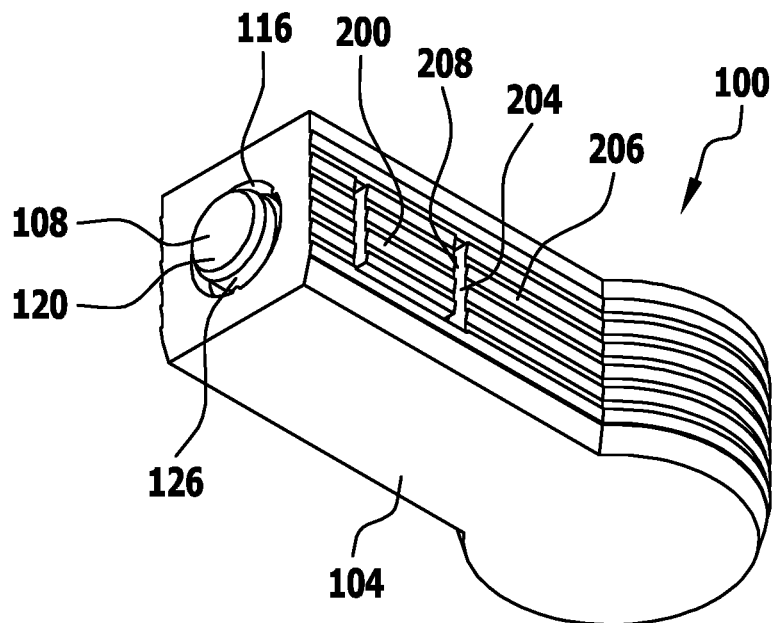
FIG. 24 shows a schematic perspective depiction of a fourth embodiment of a connecting device, in which a spreading device is provided for anchoring a main body of the connecting device in a component, wherein a spreading element of the spreading device is present in a not-spread initial position.
Figure 25:
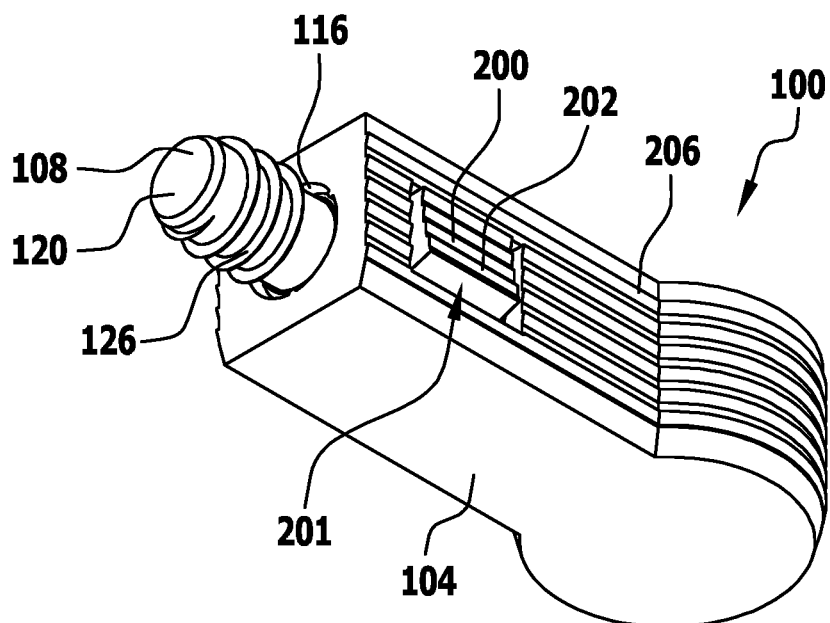
FIG. 25 shows a schematic depiction corresponding to FIG. 24 of the fourth embodiment of the connecting device, wherein the spreading element has been actuated by means of the fixing element and brought into a spread position.
Figure 26:
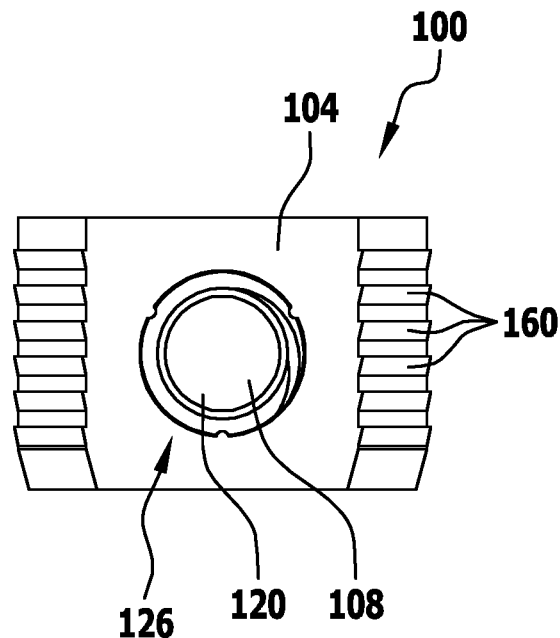
FIG. 26 shows a schematic top view of a face side of the main body of the connecting device from FIG. 24 in a not spread initial state.
Figure 27:
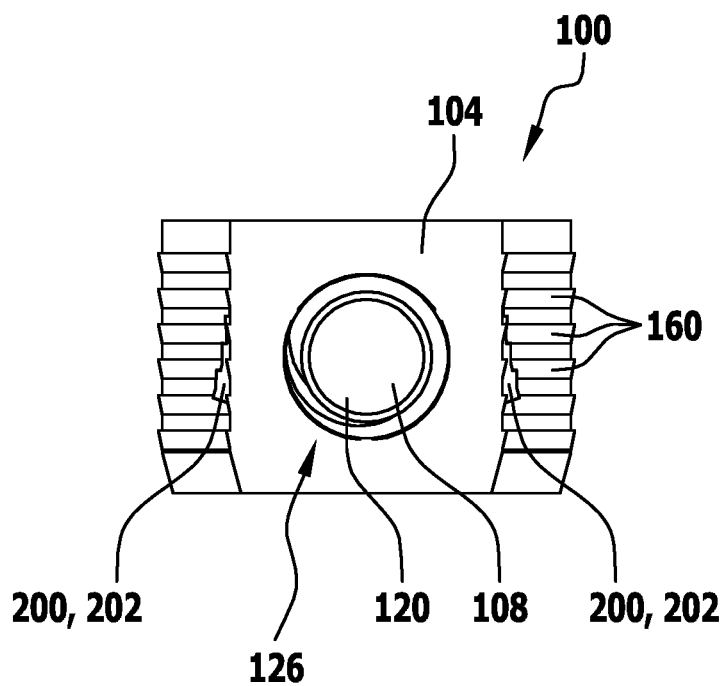
FIG. 27 shows a schematic depiction corresponding to FIG. 26 of the connecting device from FIG. 24 in a spread state of the spreading device.

As is indicated in particular by a comparison of FIGS. 24 and 25, the spreading elements 200 are in particular arrangeable, on the one hand, in the initial position depicted in FIG. 24 and, on the other hand, in the spread position depicted in FIG. 25.

Figure 28:
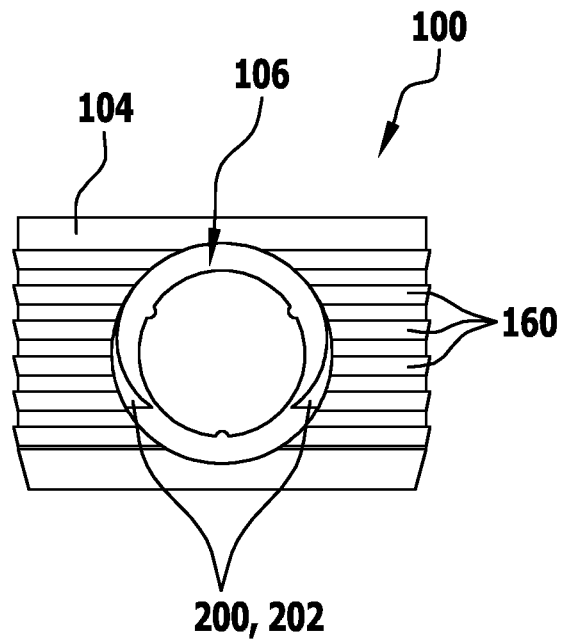
FIG. 28 shows a schematic top view of an end of the main body of the connecting device from FIG. 24, which end is remote from the face side, with view into a receiving channel of the main body, into which two spreading elements of the spreading device project.

In the initial position, the spreading elements 200 project in particular into the receiving channel 106 (see in particular FIG. 28). In the spread position, however, the spreading elements 200 are moved outwardly out of the receiving channel 106 by means of the screw head 122 of the fixing element 108 configured as a screw 120. In the spread position, the spreading elements 200 thus project over an outer contour of the main body 104.

In the assembled state of the connecting device 100 in a component 102, the spreading elements 200 are pressed into the component 102 by means of the fixing element 108.

As a result, in particular a stable clamping and/or anchoring fixing of the main body 104 in the component 102 may be achieved.

The spreading elements 200 are formed, for example, by C-shaped recesses 204 in side walls 206 of the main body 104.

In particular, C-shaped separating slots 208 are provided in the main body 104 in order to form the spreading elements 200.

Figure 29:
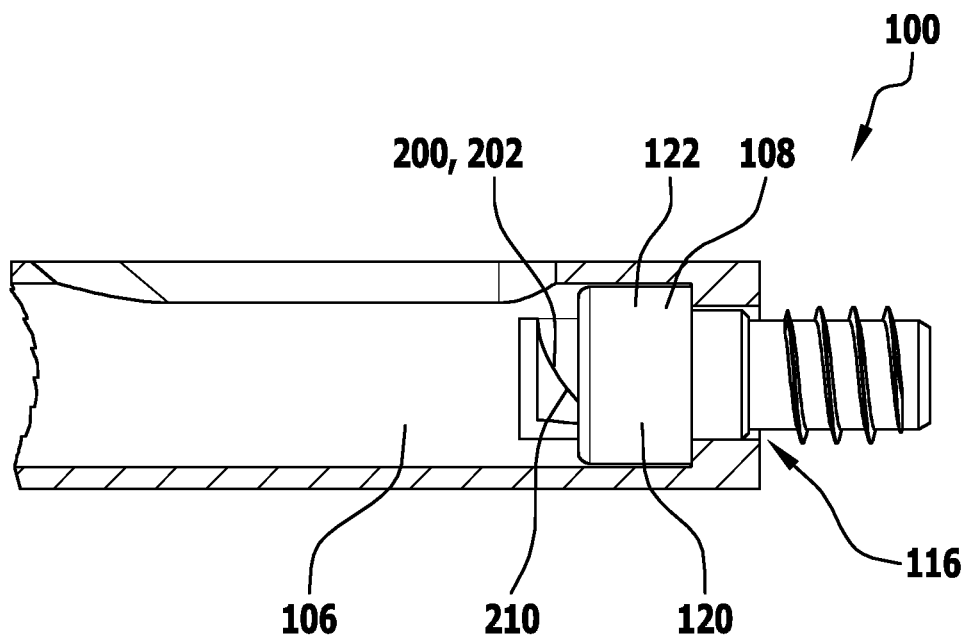
FIG. 29 shows a schematic depiction corresponding to FIG. 3 of the connecting device from FIG. 24, wherein a spreading element of the spreading device has been brought into the spread position by means of the fixing element.

As may be gathered in particular from FIG. 29, the spreading elements 200 preferably each comprise one or more oblique faces 210, on which the fixing element 108, in particular the screw head 122, engages in order to bring the spreading elements 200 from the initial position into the spread position.

The spreading elements 200 are preferably formed and/or arranged to be elastically resilient.

If the fixing element 108 is removed from the fixing opening 116, the spreading elements 200 thus preferably automatically move from the spread position back into the initial position.

In all other respects, the fourth embodiment of the connecting device 100 depicted in FIGS. 24 to 29 corresponds with respect to construction and function to the first embodiment depicted in FIGS. 1 to 12, such that reference is made to its preceding description in that regard.

Figure 30:
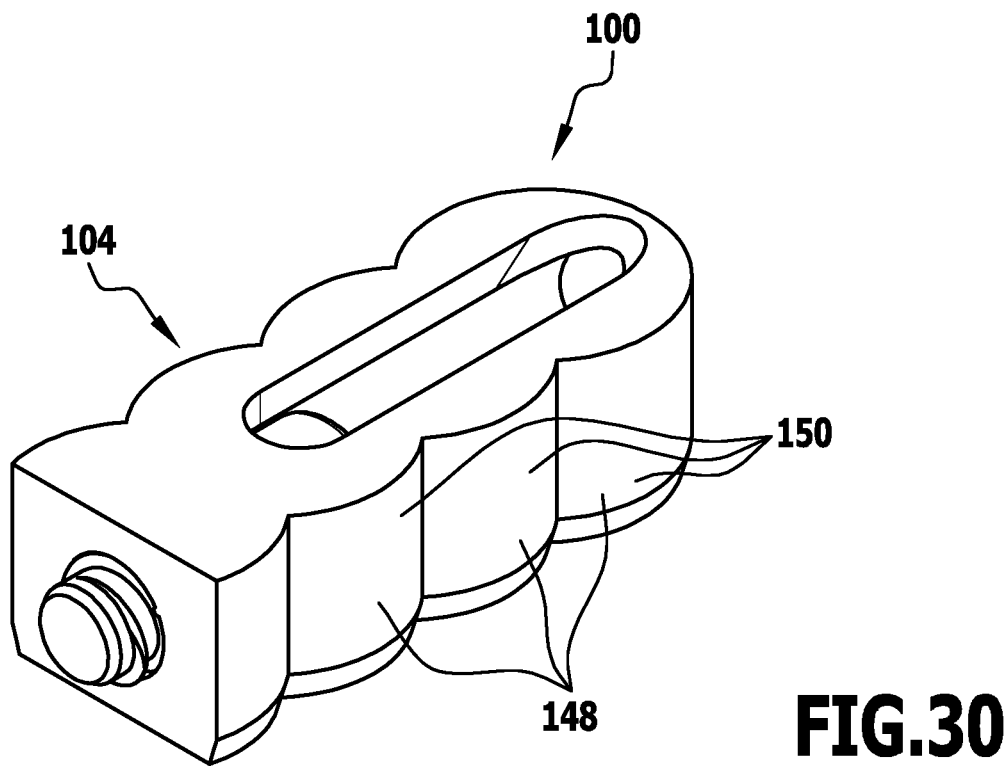
FIG. 30 shows a schematic perspective depiction of a fifth embodiment of a connecting device, in which multiple at least sectionally cylindrical anchoring sections are provided.

A fifth embodiment of a connecting device 100 depicted in FIG. 30 differs from the first embodiment depicted in FIGS. 1 to 12 substantially in that the connecting device 100 comprises multiple, for example three or four, anchoring sections 148, which in particular are configured as at least sectionally cylindrical thickenings 150.

The anchoring sections 148 preferably overlap each other in such a way that the main body 104 in a cross section is cloud-shaped, for example.

Anchoring ribs 160 are not provided in the fifth embodiment of the connecting device 100 depicted in FIG. 30. However, in a further (not depicted) embodiment, the cloud shape depicted in FIG. 30 may indeed be provided in combination with anchoring ribs 160.

In all other respects, the fifth embodiment of the connecting device 100 depicted in FIG. 30 corresponds with respect to construction and function to the first embodiment depicted in FIGS. 1 to 12, such that reference is made to its preceding description in that respect.

Figure 31:
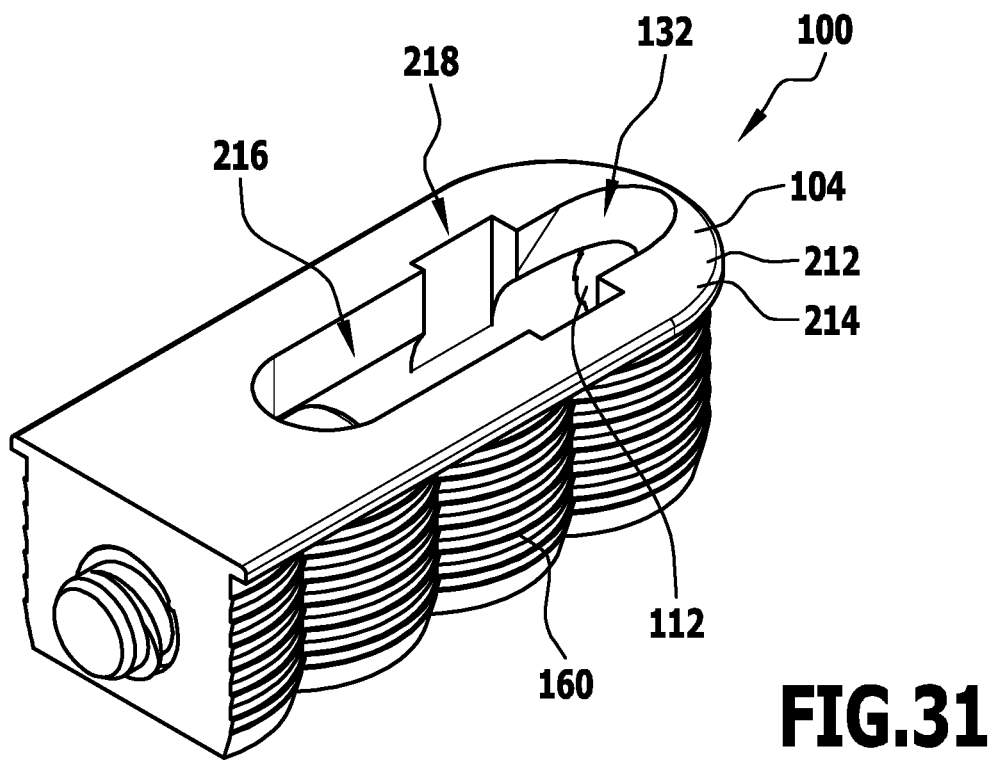
FIG. 31 shows a schematic depiction corresponding to FIG. 30 of a sixth embodiment of a connecting device, in which, among other things, a collar for covering a rim of a recess in a component and an actuating opening serving as an insertion opening are provided.

A sixth embodiment of a connecting device 100 depicted in FIG. 31 differs from the fifth embodiment depicted in FIG. 30 substantially in that the main body 104 is provided with anchoring ribs 160.

In addition, the main body 104 comprises a covering section 212, by means of which in particular a rim of the recess 152 in a component 102 is coverable.

The covering section 212 is configured in particular as a laterally projecting collar 214 on the main body 104.

The covering section 212, in particular the collar 214, has in particular a geometrically simpler shape than the anchoring sections 148 of the main body 104, whereby in particular an aesthetic appearance of the connecting device 100 in the assembled state thereof may be achieved.

Further, in the embodiment of the connecting device 100 depicted in FIG. 31, provision is made for the actuating opening 132 to be formed at least in sections and/or at least approximately complementary to an outer contour of the fixing element 108.

In particular, the actuating opening 132 comprises a narrow slot section 216 and a section 218 that is wider in comparison hereto.

The slot section 216 and the wider section 218 are in particular formed such that a fixing element 108 configured as a screw 120 is insertible into the receiving channel 106 through the actuating opening 132.

The insertion opening 112 is thus optional in the sixth embodiment of the connecting device 100 depicted in FIG. 31.

In all other respects, the sixth embodiment of the connecting device 100 depicted in FIG. 31 corresponds with respect to construction and function to the fifth embodiment depicted in FIG. 30, such that reference is made to its preceding description in this regard.

In further (not depicted) embodiments of connecting device 100, individual or multiple features of the embodiments described above may be combined with each other in any way.

For example, an obliquely oriented face side 128 in accordance with the second embodiment depicted in FIGS. 13 and 14 may also be provided in the third embodiment of the connecting device 100 depicted in FIGS. 15 to 18. Further, a collar 214 and/or covering section 212 for covering a rim region of the recess 152 arranged in the component 102 may, for example, also be provided in the embodiment of the connecting device 100 depicted in FIGS. 1 to 12.

REFERENCE NUMERAL LIST 100 connecting device
102 component
102a first component
102b second component
104 main body
106 receiving channel
108 fixing element
110 end
112 insertion opening
114 end
116 fixing opening
118 tapering section
120 screw
122 screw head
124 connecting direction
126 threaded section
128 face side
130 rotational axis
132 actuating opening
134 tool
136 engagement section
138 spherical head
140 engagement axis
142 actuating slot
144 angular gear
146 base section
148 anchoring section
150 thickening
152 recess
154 main side
156 narrow side
158 outer side
160 anchoring rib
162 retaining projection
164 retaining rib
166 bore 168 anchoring bolt
170 positioning projection
172 counter piece
200 spreading element
201 spreading device
202 pivoting element
204 recess
206 side wall
208 diving slot
210 oblique face
212 covering section
214 collar
216 slot section
218 section
α(alpha) angle
$D_A$ outer diameter
$D_I$ inner diameter

The invention claimed is:

1. A connecting device for connecting two components, wherein the connecting device comprises a main body, which comprises a receiving channel extending through the main body configured to accommodate a fixing element, wherein the receiving channel is accessible at an end by way of a fixing opening of the main body,
wherein the main body comprises an actuating opening that is different from an insertion opening or the fixing opening, the actuating opening being transverse to and in communication with the receiving channel, wherein the fixing element may be inserted into the receiving channel via the actuating opening and actuated through the actuating opening,
wherein the main body comprises a base section and multiple anchoring sections projecting away or protruding from the base section for anchoring the main body in one of the components, wherein the anchoring sections are configured as at least sectionally cylindrical thickenings, wherein the at least sectionally cylindrical thickenings directly adjoin each other, wherein the cylindrical thickening portions are arranged one directly after the other in a connecting direction,
wherein the at least sectionally cylindrical thickenings are arranged along a direction parallel to a connecting direction of the connecting device, said connecting direction being arranged parallel to a connecting force acting on the two components and drawing them towards each other, and
wherein the connecting direction is a direction perpendicular to one of the two components which are to be connected with each other.

2. The connecting device in accordance with claim 1, wherein the actuating opening is configured as an actuating slot.

3. The connecting device in accordance with claim 1, wherein the main body is formed as one piece.

4. The connecting device in accordance with claim 1, wherein the main body is configured as a plastic injection molded component or as a metal die cast component.

5. The connecting device in accordance with claim 1, wherein the fixing element is a screw and:
a) the insertion opening is larger than a screw head of the screw, or
b) the fixing opening is smaller than the screw head of the screw, or
c) the fixing opening is larger than a threaded section of the screw.

6. The connecting device in accordance with claim 1, wherein the main body comprises the actuating opening which is, in at least one direction, smaller than a maximum, minimum, or average outer diameter, taken perpendicularly to the connecting direction of the fixing element, of the fixing element configured as a screw.

7. The connecting device in accordance with claim 1, wherein the fixing element comprises an engagement section, on which a user of the connecting device may engage by means of a tool for actuating the fixing element.

8. The connecting device in accordance with claim 7, wherein the tool for actuating the fixing element, together with the engagement section, forms an angular gear.

9. The connecting device in accordance with claim 1, wherein the base section is a three-dimensional elongated shape.

10. The connecting device in accordance with claim 9, wherein at least one of the anchoring sections is configured as a cylindrical thickening of an end of the main body remote from the fixing opening.

11. The connecting device in accordance with claim 1, wherein the main body comprises the actuating opening which extends in a direction running parallel to the connecting direction of the connecting device over at least a third of a length of the main body taken in the connecting direction.

12. The connecting device in accordance with claim 1, wherein an outer side of the main body remote from the receiving channel is provided at least in sections with anchoring ribs for anchoring the main body in one of the components.

13. The connecting device in accordance with claim 1, wherein the connecting device, in addition to the fixing element and the main body, comprises a counter piece, wherein the fixing element is able to be brought into engagement with the counter piece for connecting the two components.

14. A combination of two components and a connecting device in accordance with claim 1, wherein one of the components comprises a recess corresponding to an external shape of the main body of the connecting device, such that the main body is fixable in the component in a positive-fitting manner.

15. A method for connecting two components, comprising:
providing a component;
introducing a recess by processing the component;
inserting a main body of a connecting device in accordance with claim 1 into the recess;
connecting the components to each other by actuating the fixing element of the connecting device arranged in the main body.

16. The method of claim 15, wherein the component in which the recess is introduced is plate-shaped.

17. The method of claim 15, wherein the recess is introduced into the component by means of a milling machine, in which a milling head is rotated about a rotational axis running perpendicularly to a main side of the component.

18. A connecting device for connecting two components, wherein the connecting device comprises a main body, which comprises a receiving channel extending through the main body configured to accommodate a fixing element, wherein the receiving channel is accessible at an end by way of a fixing opening of the main body, wherein the main body comprises an actuating opening that is different from an insertion opening or the fixing opening, the actuating opening being transverse to and in communication with the receiving channel, wherein the fixing element may be inserted into the receiving channel via the actuating opening and actuated through the actuating opening, wherein the main body comprises a base section and an anchoring section protruding away or projecting from the base section for anchoring the main body in one of the components, wherein the anchoring section is configured as cylindrical thickening portions of an end of the main body remote from the fixing opening, and wherein the cylindrical thickening portions directly adjoin each other, wherein the at least sectionally cylindrical thickenings are arranged along a direction parallel to the connecting direction of the connecting device, said connecting direction being arranged parallel to a connecting force acting on the two components to connect the two components and drawing them towards each other, and wherein the connecting direction is a direction perpendicular to one of the two components which are to be connected with each other.

19. The connecting device in accordance with claim 18, wherein the main body comprises the actuating opening that is configured as an actuating slot.

20. The connecting device in accordance with claim 18, wherein the main body comprises the actuating opening which is configured, at least in sections or at least substantially, complementarily to an outer contour of the fixing element.

21. The connecting device in accordance with claim 18, wherein the actuating opening of the main body comprises a narrow slot section and a section that is wider in comparison thereto, wherein the narrow slot section and the wider section are configured such that the fixing element configured as a screw is introducible into the receiving channel through the actuating opening.

22. The connecting device in accordance with claim 18, wherein the main body is formed as one piece.

23. The connecting device in accordance with claim 18, wherein the main body is configured as a plastic injection-molded component or as a metal die-cast component.

24. The connecting device in accordance with claim 18, wherein the fixing element is a screw and:

a) the insertion opening is larger than a screw head of the screw, or
b) the fixing opening is smaller than the screw head of the screw, or
c) the fixing opening is larger than a threaded section of the screw.

25. The connecting device in accordance with claim 18, wherein the actuating opening of the main body extends in a direction running parallel to the connecting direction of the connecting device over at least a third of a length of the main body taken in connecting direction.

26. A combination of two components and a connecting device in accordance with claim 18, wherein one of the components comprises a recess corresponding to an external shape of the main body of the connecting device, such that the main body is fixable in the component in a positive-fitting manner.

27. A method for connecting two components, comprising:
   providing a component;
   introducing a recess by processing the component;
   introducing a main body of a connecting device in accordance with claim 18 into the recess;
   connecting the components to each other by actuating the fixing element of the connecting device arranged in the main body.

28. The method of claim 27, wherein the recess is introduced into the component by means of a milling machine, in which a milling head is rotated about a rotational axis running perpendicularly to a main side of the component.

29. The connecting device in accordance with claim 18, wherein the cylindrical thickening portions are arranged one directly after the other in a connecting direction of the connecting device.

* * * * *